Nov. 29, 1960  G. R. OLIVER  2,961,996
ANIMAL GROOMING DEVICE
Filed Dec. 9, 1958

George R. Oliver
INVENTOR.

BY Robert J Path
ATTY

United States Patent Office 2,961,996
Patented Nov. 29, 1960

2,961,996

ANIMAL GROOMING DEVICE

George R. Oliver, 220 N. Rosedale Ave., Tulsa, Okla.

Filed Dec. 9, 1958, Ser. No. 779,116

2 Claims. (Cl. 119—86)

The present invention relates to animal grooming devices, and more particularly to such devices of the knife type.

In the case of pet animals such as dogs, particularly those having long hair, the problem of keeping the hair well groomed presents considerable difficulty. Particularly when combing has been neglected for awhile, the hair tends to ball and tangle and snarl to the point that it cannot be straightened with conventional tools now available. The only solution is to clip off all the hair or, in the case of a show dog, where this is obviously impossible, to cut the mat with scissors and then to pick at it with a comb until the cut and loosened hair is removed at the point of tangling.

The operation of cutting the tangled mat is quite difficult to perform without leaving unsightly holes in the coat. Also, when conventional tools are used to split the tangle, it is extremely difficult to work upon tangles close to the animal's skin without cutting or jabbing the animal. Naturally, such procedures are quite upsetting not only to the animal but also to the person performing the treatment; and in the case of show dogs, for example, such treatment often renders the dog highly nervous and too upset for showing.

Accordingly, it is an object of the present invention to provide devices for quickly splitting tangles and snarls in the coats of animals.

Another object of the present invention is to provide devices in the nature of knives that will not cut or jab an animal or otherwise cause the animal discomfort.

Still another object of the present invention is the provision of such devices that are adapted to work upon tangles and snarls close to the skin of the animal while at the same time removing a minimum of the coat of the animal.

Finally, it is an object of the present invention to provide such implements that will be simple and inexpensive to manufacture, easy to operate and durable in use.

Other objects and advantages of the present invention will become apparent from a consideration of the following description, taken in connection with the accompanying drawing, in which.

Figure 1:
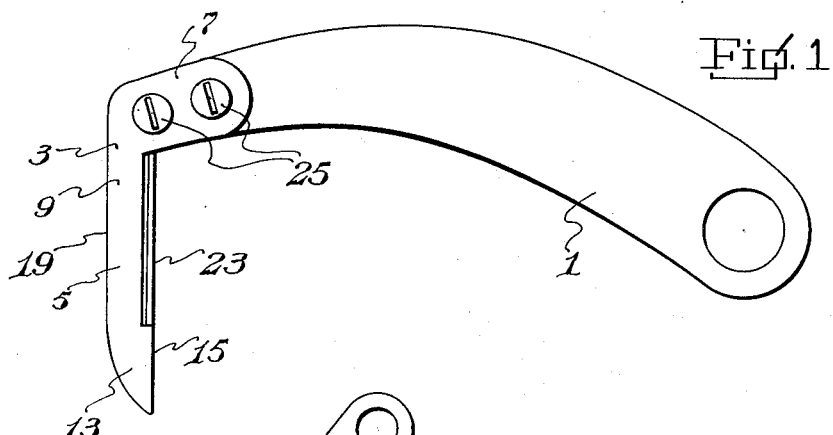
Figure 1 is an elevational view of an animal grooming device according to the present invention.

Referring now to the drawing in greater detail, there is shown an animal grooming device in the nature of a knife comprising a flat, elongated handle 1 having secured to its forward end an elongated blade holder 3 that extends transversely of handle 1 at about a right angle thereto. Blade holder 3 is comprised of a pair of joined halves 5 which are spaced apart in parallelism to each other over the greater part of their extent. Each half 5 is identical to and overlies the other half 5 and includes a base portion 7 adapted to be secured to handle 1, a blade clamping portion 9 extending from base portion 7 a major portion of the length of blade holder 3 and having a cut-away portion defining an elongated recess 11 on the handle side of the blade holder 3. Each half 5 terminates in an end portion 13 disposed endwise outwardly of recess 11, the two end portions 13 of halves 5 being joined by a straight bend line 19 about which the two halves 5 are bent through 180° into parallelism with each other and with the plane of flat handle 1. Blade holder 3 has a welded convex marginal edge 17 extending from the outer end of straight weld line 15 to the longitudinal folded edge 19 of blade holder 3 which is opposite and parallel to recess 11.

An elongated blade 21 is detachably secured to blade holder 3 between halves 5 thereof. Blade 21 has an elongated straight cutting edge 23 that extends full length thereof; and blade 21 is so disposed between blade holder halves 5 that most of blade 21 is secured between blade clamping portions 9 thereof. Only that edge portion of blade 21 adjacent cutting edge 23 thereof extends into recess 11, blade 21 being so disposed that its end remote from handle 1 is disposed at the outer end of recess 11 and its cutting edge 23 is aligned with weld line 15, so that weld line 15 forms in effect a marginal edge of blade holder 3 which is an endwise outward continuation of cutting edge 23.

In order to secure blade 21 releasably between blade holder halves 5, a pair of spaced fastening members 25 is provided which extend through both base portions 7 of blade holder 3 and through screw-threaded openings through the forward end of handle 1. Fastening members 25 are in the illustrated embodiment in the form of screws such that upon tightening the screws, the two halves 5 of blade holder 3 are drawn together thereby to cause blade clamping portions 9 fixedly to clamp the blade 21 therebetween. In this position, cutting edge 23 is exposed for use and extends substantially full length of recess 11. It will also be noted that by this manipulation, blade 21 may be readily inserted and secured in operative position and readily changed from time to time as cutting edge 23 becomes dull. Of course, it will be recognized that blade 21 is for example a commonly commercially available injector razor blade.

Figure 2:
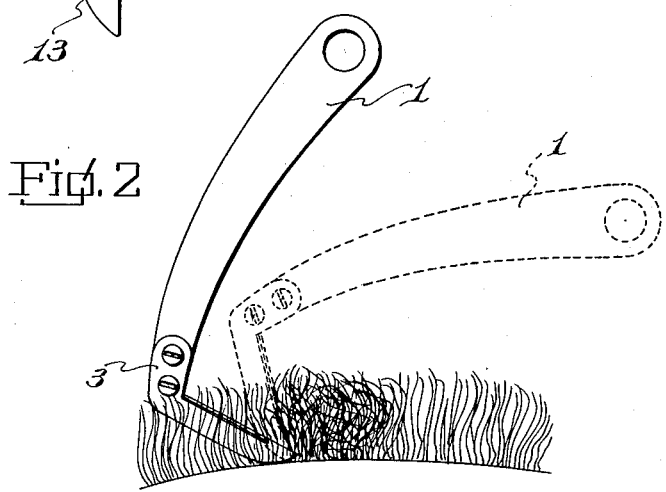
Figure 2 is a view similar to Figure 1 but showing the device in use for splitting a mat in an animal's coat.
Figure 3:
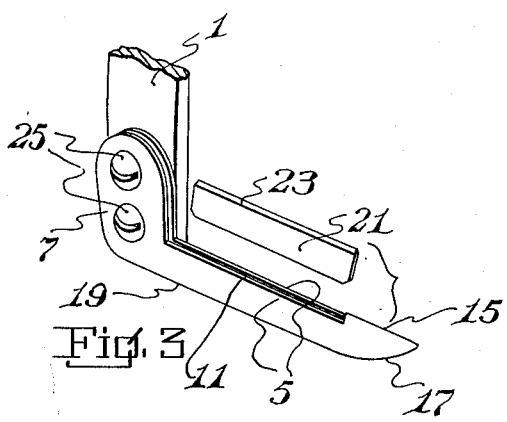
Figure 3 is an enlarged fragmentary perspective view of the operative end of the device according to the present invention, showing the blade in a separated position.
Figure 4:
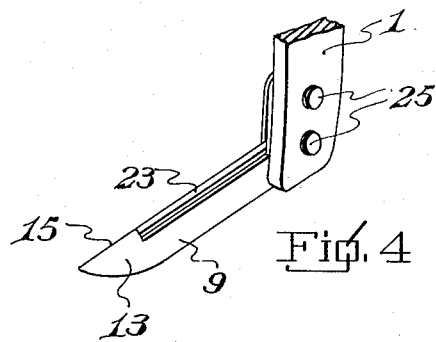
Figure 4 is an enlarged perspective view of the other side of the fragment shown in Figure 3, but illustrating the blade in operative position.

The operation of the device is as follows:

When in combing the coat of an animal a tangle or snarl is encountered, and it is found to be impossible to remove such a snarl by combing alone, the device of the present invention is grasped by handle 1 and inserted through the coat of the animal in the position shown in broken line in Figure 2 until the tip of end portion 13 contacts the skin of the animal and further penetration is presented. The device is then rocked along convex marginal edge 17 until it assumes the position shown in full line in Figure 2. In this position, no sharp edge or corner is in contact with the skin of the animal and the device may then be pulled toward the operator without danger of jabbing or scratching the animal. As the device is pulled toward and into the mat, the mat rides up along weld line 15 until it reaches cutting edge 23, whereupon edge 23 begins to split the mat. Several passes through the mat will usually suffice to loosen enough of the tangled hair that upon gentle combing, the mat can be entirely dispersed. It is especially important to notice that the configurations of weld line 15 and convex marginal edge 17 assure that mats may be split which are quite close to the skin, without jabbing the animal or scratching its skin with the point of the device and without cutting the animal or cutting an excessive quantity of hair with cutting edge 23. It is also particularly to be noted that the wedge action between the mat and the skin which is effected by the diverging marginal edges of holder 3 defined by weld line 15 and convex edge 17 assures that the mat will be split by the cutting edge 23 but without tugging at the coat, for as the point of the blade holder wedges in between the mat and the skin, cutting edge 23 begins to cut through the mat before the pull on the hair becomes uncomfortably great.

In view of the above disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An animal grooming device comprising an elongated handle, an elongated blade holder extending laterally from one end of the handle and terminating in a free end remote from the handle, and an elongated blade detachably secured to the blade holder and extending lengthwise thereof, the blade having a straight cutting edge extending lengthwise thereof on the handle side of the blade and terminating short of the free end of the blade holder, the blade holder having a straight marginal edge comprising an outward extension of the straight cutting edge of the blade, the blade holder having a convex marginal edge extending between the outermost end of the first-mentioned marginal edge and the longitudinal edge of the blade holder opposite the cutting edge of the blade.

2. An animal grooming device comprising an elongated handle, an elongated blade holder extending laterally from one end of the handle in the plane of the handle and terminating in a free end remote from the handle, and an elongated blade detachably secured to the blade holder and extending lengthwise thereof, the blade having a cutting edge extending lengthwise thereof on the handle side of the blade and terminating short of the free end of the blade holder, the blade holder having a marginal edge comprising an endwise outward extension of the cutting edge of the blade, the outer end of said cutting edge and the inner end of said marginal edge being contiguous, the blade holder being in the form of a pair of elongated parallel strips spaced apart one on either side of the blade but joined together along said marginal edge.

References Cited in the file of this patent

UNITED STATES PATENTS

| | | |
|---|---|---|
| 1,339,436 | Conrad | May 11, 1920 |
| 2,520,464 | Hubner | Aug. 29, 1950 |

FOREIGN PATENTS

| | | |
|---|---|---|
| 252,308 | Switzerland | Dec. 31, 1947 |